United States Patent [19]

Herrmann

[11] 4,042,298
[45] Aug. 16, 1977

[54] DOCUMENT FILMING CAMERA

[75] Inventor: John A. Herrmann, Bloomington, Minn.

[73] Assignee: Minnesota Mining and Manufacturing Company, St. Paul, Minn.

[21] Appl. No.: 659,235

[22] Filed: Feb. 19, 1976

[51] Int. Cl.² .................. G03B 27/52; G01D 9/42; G03B 27/70
[52] U.S. Cl. .................. 355/40; 346/107 R; 355/65
[58] Field of Search .................. 346/107 R; 352/92; 355/40, 43, 49, 65, 66

[56] References Cited

U.S. PATENT DOCUMENTS

| | | | |
|---|---|---|---|
| 2,937,914 | 5/1960 | Blake | 346/107 R |
| 2,952,504 | 9/1960 | Path | 346/107 R |
| 3,212,399 | 10/1965 | Walter | 352/92 |
| 3,350,716 | 10/1967 | Trolio et al. | 346/107 R X |
| 3,515,470 | 6/1970 | Browder | 352/92 |
| 3,539,257 | 11/1970 | Hoyne et al. | 355/65 |
| 3,819,854 | 6/1974 | Kolb | 355/40 |
| 3,902,802 | 9/1975 | Murata et al. | 355/43 |

*Primary Examiner*—Donald A. Griffin
*Attorney, Agent, or Firm*—Cruzan Alexander; Donald A. Sell; John C. Barnes

[57] ABSTRACT

A document filming camera for placing successive images of documents or the image of a continuous document on a strip of film and for adding recording marks along the edge of the film indicating the position of the frame on the film exposed to a document and for placing marks at intervals along the film when filming a continuous fan-fold document, as produced by a computer, to indicate the location of each successive page of the document.

13 Claims, 6 Drawing Figures

DOCUMENT FILMING CAMERA

BACKGROUND OF THE INVENTION

1. Field of the Invention

This invention relates to an improvement in document photographing cameras and in particular to improvements in devices for exposing recording index marks along the edges of the film when continuous form documents are being photographed.

2. Description of the Prior Art

Cameras are well known in the art which will expose onto the film, contemporaneous with the filming of the documents, machine readable index marks along the margin of the film such that the successive frames may be counted photoelectrically or afford a visible index on the film as the film is scanned. When photographing continuous form documents (fan-fold type) like that obtained as output from a line printer used with a computer system, to provide index marks along each page of this continuous form document, the prior art cameras have been provided with systems for placing index marks on the film as the film is moved. Prior art teachings of marking film are provided in U.S. Pat. No. 2,937,914; issued May 24, 1960 to Blake; U.S. Pat. No. 2,952,504, issued Sept. 13, 1960 to Path; U.S. Pat. No. 3,515,470, issued June 2, 1970 to Browder; and U.S. Pat. No. 3,902,802, issued Sept. 2, 1975 to Murata et al.

This latter mentioned patent discloses a photographing device for putting index marks on the film when lengthy web-form objects as well as short sheet documents are fed through the device. The photographing device is provided with a shutter controlled by pulse signals produced in response to the movement of the film for exposing the recording index marks on the film. This patent discloses a device for putting marks sequentially on the film when a continuous form document is being photographed as in the present invention but the manner of accomplishing this result is significantly different and not adapted to different formats of continuous documents. In this patented device pulses are generated from a light sensitive device to produce pulses as a slotted disc is driven past the light-receiving element which will control the shutter for exposing the film to the index markings. The spacing of the index marks on the film can be varied, as taught in the patent at column 5, lines 46 to 60, by changing the disc to substitute a disc wherein the position or spacing of the slits on the disc are different. This type of control does not afford a camera adaptable to the variety of sheet sizes for fan-fold type line printer output which are standardized within the United States and foreign countries per International Standards Organization Publication No. ISO2784.

SUMMARY OF THE PRESENT INVENTION

The present invention affords a device to be combined with a rotary document microfilm camera having an exposure device for placing edge code markings on the film simultaneous with the photographing of the documents. The device of the present invention holds, guides, feeds to the camera feed roll, and stacks continuous fan-fold type documents and comprises a pin wheel adjacent a document guide and driven by the equally spaced guide holes along the edge of the document. A first disc/photocouple feeder sensor energized by rotation of the pin wheel to generate pulse signals as each pin of the wheel moves past a predetermined point translates the movement of incremental lengths of the document into signals directed to a first adjustable counter means for receiving said pulse signals and sequentially energizing said exposure device. A second disc/photocouple document roll sensor for generating pulses upon rotation of said feed roll through predetermined increments of rotation signals a second counter means. The second counter means is reset to 0 upon a pulse being generated by the feeder sensor and when it is not reset because no pulses are received it sends a pulse signal to the first counter means after reaching a predetermined count. The pulse generating means driven by the document roll sensor and the second counter means afford means to place frame code or indexing marks on the film for the last two or three pages of a fan-fold document when the pages are short and a number of pages extend between the document exposing station and the pin wheel which drives the first disc/photocouple feeder sensor pulse generating means. This assures an indexing mark for every sheet of the continuous document until the document switch operated by a document on the feed roll is returned to a normally closed position.

BRIEF DESCRIPTION OF THE DRAWING

This invention will be more further understood after a perusal of the following detailed descriptin of the invention which refers to the accompanying drawing wherein.

DESCRIPTION OF THE PREFERRED EMBODIMENT

Figure 1:
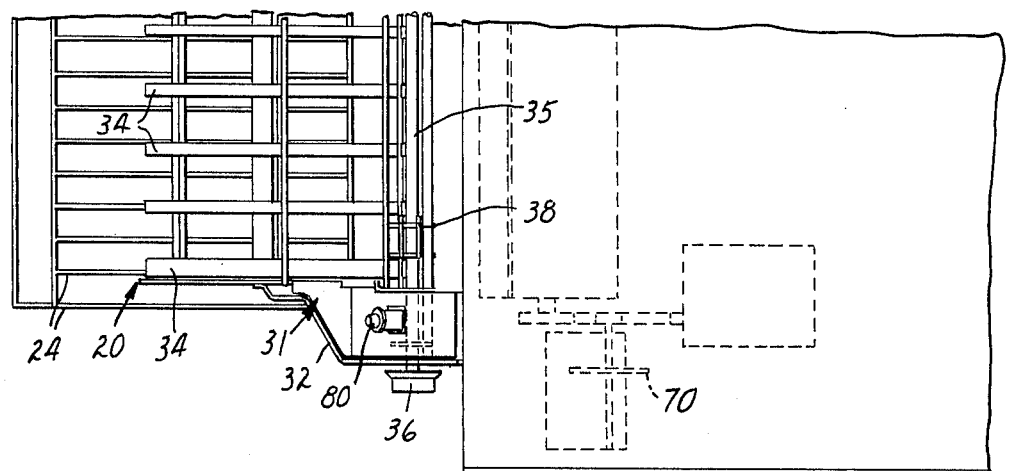
FIG. 1 is a fragmentary plan view of an attachment to a document microfilm camera constructed according to the present invention.
Figure 2:
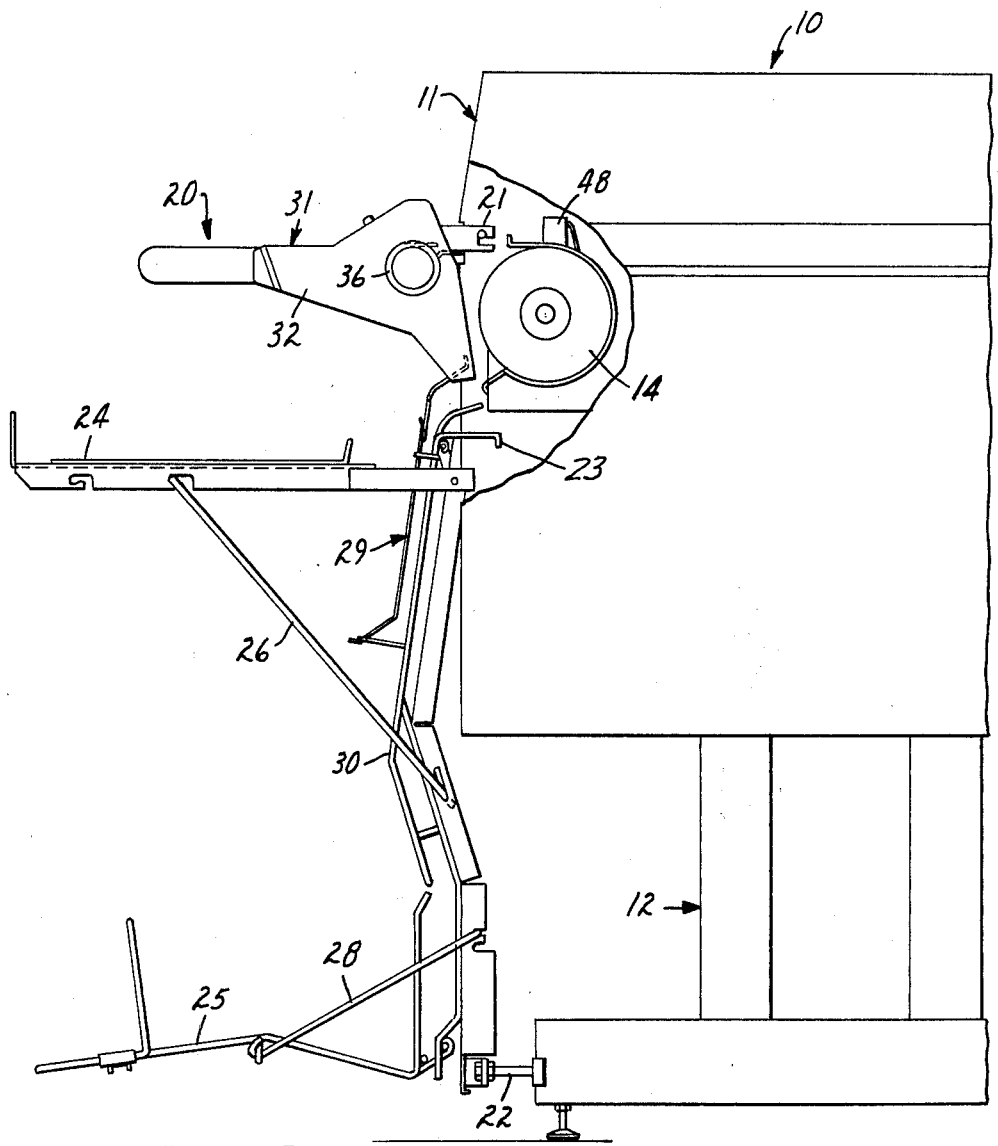
FIG. 2 is a side view of a document microfilm camera having the attachment of FIG. 1 connected thereto, portions of the camera being shown in partial sectional view for purposes of description.

Referring now to the drawing there is shown in FIG. 1 a rotary camera 10 having a frame 11 and stand 12. The camera 10 has an inlet opening at the front for receiving a document to be photographed, and the document is received on a rotatable document feed roll 14 disposed within the frame 11 and continuously driven when the camera is in operation. Documents inserted in the camera are drawn past an exposure station by the feed roll and then discharged from an opening spaced from the inlet opening.

The present invention adds to the camera 10 the capability of photographing continuous type documents such as fan-fold line printer output copy and applying an index mark on the film adjacent the image of each sheet of the folded copy.

The attachment for the camera 10 comprises a frame 20 which may be attached onto the front of the camera and stand by pin and slot type fastener means 21 to the camera, a hook 23 and by an adjustable leg 22. The frame comprises a normally horizontally-positioned support tray 24 for the fan-fold document to be photographed and a lower tray 25 to receive the document and refold the same after it is photographed. The tray 24 is foldable and adjustable. In operative position it is supported by a leg 26 and the tray 25 is foldable and held in position by an arm 28. A guide chute 29 directs the document from the feed roll 14 to the tray 25 along the front face 30 of the frame 20.

At the top of the frame 20 is a rack 31 which guides the document into the camera 10. This rack comprises end plates 32 (only one of which is shown) between which are positioned a plurality of spaced bars 34 over which the document is drawn and a transversely positioned shaft 35. On one end of the shaft 35 is a knob 36 and movably positioned along the shaft 35 are a pair of sprocket or pin wheels 38 (one of which is illustrated) with smooth pins spaced circumferentially ½ inch (1.27 cm) about their periphery. A hinged guide maintains the edge of the document in contact with the pin wheels so the pins engage the holes spaced ½ inch (1.27 cm) along one or both edges of the document 40 as shown in FIG. 3.

Positioned on the shaft 35 and driven by the shaft 35 is a slotted disc 41 (FIG. 3) having a thin slot 42 representing each pin on the pin wheel. The disc 41 represents part of a feeder sensor 112 to be described. Disposed on one side of the disc 41 and aligned with the slots 42 is a light source 44, a light emitting diode, and a light-receiving element 45, a silicon phototransistor is positioned on the opposite side to produce a pulse signal upon movement of each slot 42 between and past the light source 44 and receiving element 45. As the disc 41 is driven by the pin wheel 38 and the document 40 through a given increment of rotation a pulse is sent to the control circuitry for controlling the camera indexing mark device.

Figure 3:
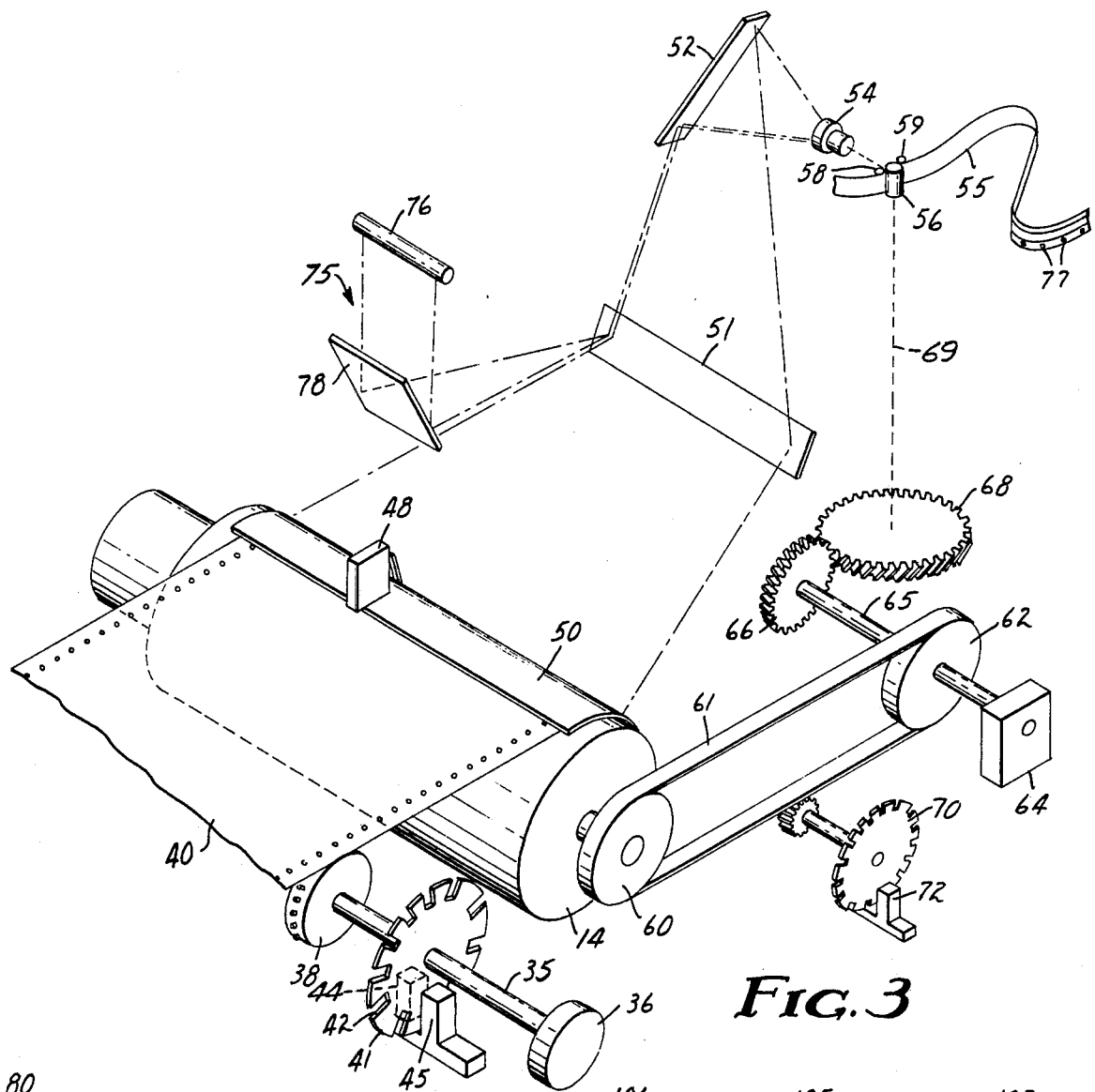
FIG. 3 is a schematic perspective view of the working relationship of the attachment and the microfilm camera.

As illustrated in FIG. 3 the document 40 is drawn about the feed roll 14 past a document switch 48 and past an opening in a pressure shoe 50, which opening defines the exposure station. At this opening the document is illuminated by suitable lamps, and successive images are projected via mirrors 51 and 52 to a projection lens 54. The lens 54 focuses the image on the film 55 positioned at the focal plane and driven via a capstan 56 and pressure rollers 58 and 59 at a speed synchronized with the rotation of the feed roll 14. The drive for the capstan 56 is afforded by a motor which directly drives the feed roll 14 at one end, and the feed roll has a shaft with a pulley 60 connected thereto extending from the other end. The pulley 60 drives a timing belt 61 extending from the pulley 60 to a pulley 62 supported on an input hub of a one-way solenoid-operated spring clutch 64. When the clutch 64 is energized the driven pulley 62 causes the rotation of an output shaft 65, which rotation, through crossed helical gears 66 and 68, rotates a shaft 69 supporting the capstan 56.

A second sensor for the document roll includes a slotted disc 70 positioned to be operative upon rotation of the feed roll 14 to produce pulse signals indicative of movement of a point on the periphery of the feed roll 14 a given distance, i.e., equal to one-fourth the spacing between the centers of adjacent holes along the marginal edge of the fan fold document. The disc 70 is driven from the belt 61 by a sprocket wheel and shaft. Means are associated with the disc 70 for producing the pulse signal and includes a light source (not shown) aligned with the slots in the disc 70 and a light-receiving element 72 positioned on a side of the disc opposite the light source, similar to the photocoupled switch for disc 41.

The pulse generating structures are utilized to sequentially operate a page indexing mark device 107 utilized to impart a small generally rectangular mark 77 on the edge of the film 55 simultaneous with the photographing of the document. This indexing mark device 107 comprises a lamp 76 which can be energized briefly to send a light image to a mirror 78 and mirrors 51 and 52 to be projected to the marginal edge of the film. The device 107 is controlled by suitable drive circuit 105 to afford the proper operation of the device at intervals consistent with the filming of the sheets or pages of the document.

A page length selector 100 for determining the frequency of the marks is provided to the operator in the form of a knob 80 (FIG. 1) on the frame 20. This knob is set to indicate the length of the individual pages of the fan fold document, e.g., 3, 4, 6, 8½, 11 or 12 inches and suitable indicia are positioned around the knob 80 to indicate the proper placement of the knob for each length.

Figure 5:
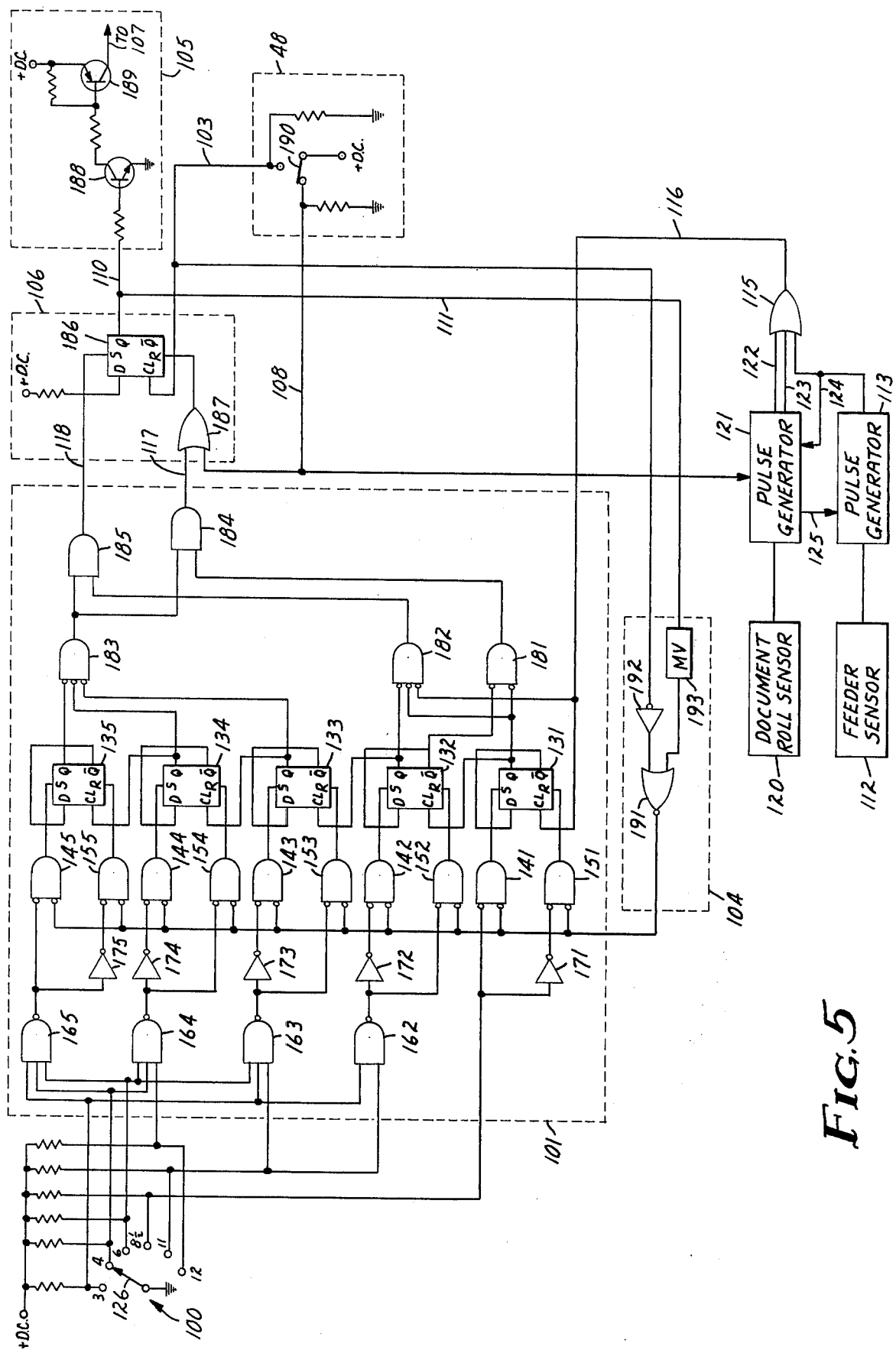
FIG. 5 is a schematic circuit diagram of the drive circuit of the block diagram.

FIG. 5 is a block diagram of the circuitry used to provide a signal for generation of the indexing mark for each selected page length processed. The circuitry includes the page length selector 100 which is manually operated by the knob 80 to a setting corresponding to the page length for which an indexing mark is to be placed at the edge of the microfilm used for filming the document having that page length. This selection is made prior to feeding the paper into the document roll 14. A page length encoder-decoder circuit 101 is connected to the output provided from the page length selector 100. Entry of the output from the selector 100 is initially controlled by the document switch 48 which, prior to its operation in response to the presence of the paper to be processed, provides a signal on conductor 103 to the gating signal circuit 104 which gates the encoder-decoder 101 to cause the output of the page length selector 100 to be continuously entered into the encoder-decoder circuit. This continuous entry of the output of selector 100 prevents any counting action from taking place prior to actuation of the document switch by the paper. The encoder-decoder circuit 101 includes a first counter means comprising a binary down-counter which is set by the output from selector 100 to reflect a count determined by the length selected.

A drive circuit 105 is provided which when enabled by the enabling circuit 106 provides a signal to initiate the operation of the timed indexing mark generator circuit 107. The timed indexing mark generator circuit 107 is operated to energize the light source 76 of the indexing mark device 75 for a short period of time. The circuit 107 is similar to the circuit previously used in the 3M 3400 Cartridge Microfilm Camera marketed by Minnesota Mining and Manufacturing Company, St. Paul, Minn., U.S.A., the assignee of this application. The circuit 107 comprises a timing circuit including a unijunction transistor timer. The lamp is a fluorescent tube. The light provided by the lamp 76 is directed to the edge of the recording film 55 to expose the film thereby place an indexing mark on the edge of the film in accordance with the time it is energized.

It is desired that the indexing mark 77 be placed on the film in correspondence with the beginning of the sheet being processed. The document switch 48 mounted on the document roll assembly is actuated when the paper is initially positioned for processing by the apparatus. This actuation of switch 48 removes the gating signal applied via conductor 103 to the gating signal circuit 104 and provides a signal on conductor 108 which is applied to the enabling circuit 106 to cause it to be set. The setting of enabling circuit 106 provides a signal via the conductor 110 to the drive circuit 105 to cause it to conduct to initiate operation of the timed indexing mark generator circuit 107. The signal provided by the setting of enabling circuit 106 is also applied via the conductor 111 to the gating signal circuit 104 which is effective to provide a signal of sufficient duration to cause the output of the page length selector 100 to be entered into the encoder-decoder 101.

The feeder sensor 112 includes the slotted disc 41 coupled to the pin wheel 38 and the photocoupled switch 45. A pulse signal is produced each time a slot is presented to the photocoupled switch which occurs for each ½ inch of paper moved to rotate the pin wheel 38. The feeder sensor 112 is connected to supply the pulses it produces to pulse generator 113 which can take the form of a conventional one-shot multivibrator circuit. A pulse is produced at the output of pulse generator 113 each time the feeder sensor 112 produces a signal. The output of the pulse generator 113 is connected via the conductor 114 to the OR circuit 115 which has its output connected via conductor 116 to the page length encoder-decoder circuit 101. Each pulse from the pulse generator 113 serves to decrement the count in the encoder-decoder circuit by one. Since two pulses are provided by the pulse generator for each inch of paper that is moved, the encoder-decoder 101 is arranged so the count provided in the encoder-decoder in response to the page length selector is equal to two times the number of inches for the page length selected.

A decoding portion in the encoder-decoder monitors the count in the encoder-decoder 101 and in response to the count being decremented by the pulses from pulse generator 113 to a count of two provides a signal to the enabling circuit 106 on conductor 117 which is effective to reset it and thereby terminate the operation of the drive circuit 105. This allows the timed indexing mark generator circuit 107 to reset for the next initiating signal from the drive circuit 105. When the count in the encoder-decoder is then decremented to zero, it is known that a page of the selected page length has been processed and the enabling circuit 106 should again be set to energize the drive circuit 105 so the timed indexing mark generator 107 can operate to provide the desired indexing mark at the beginning of the next portion of the document of the selected length. Accordingly, the encoder-decoder 101 is arranged to respond to the count being decremented to zero to provide a signal on conductor 118 which is connected to set the enabling circuit 106 to provide a signal via conductor 110 which energizes the drive circuit 105. This signal is also provided to the gating signal circuit 104 via conductor 111 which responds to again provide a gating signal to the encoder-decoder 101 to enter the output of the page length selector 100 into the encoder-decoder to establish a count as determined by the page length selector output.

Decrementing pulses are continued to be received from the pulse generator 113 to repeat the process described above so long as the document is moved to operate the feeder sensor 112.

Once the trailing edge of the document being processed passes the pin wheel 38 and feeder sensor 112 position no additional pulses are provided via the feeder sensor 112 and the pulse generator 113 to provide the needed control of the circuitry to produce the indexing marks needed for the pages at the trailing end portion of the document which remains to be filmed.

The document roll sensor 120 of the document roll pulse generating device is connected to a pulse generator 121 which includes a second counter means. The pulse generator 121 provides two output lines 122 and 123 to the OR circuit 115 and is used to provide the additional decrementing pulses to the encoder-decoder circuit 101 which are needed for processing of the trailing end portion of the document. The pulse generator 121 is not effective to provide pulses while the pulse generator 113 is providing pulses since the conductor 124 connecting the output of pulse generator 113 to pulse generator 121 is provided to inhibit or interrupt the operation of the pulse generator 121 each time the pulse generator 113 provides a pulse at its output. Operation of the pulse generator 113 ceases upon the passage of the trailing edge of the document from the feeder sensor 112 position. The pulse generator 121 is then no longer inhibited.

The document roll sensor 120 is similar in structure to the feeder sensor 112 except that it provides a pulse for every ⅛ inch of paper that is moved when processed. When the pulse generator 121 is not inhibited by pulses from pulse generator 113, a predetermined number of pulses, six in the present embodiment, are provided by the document roll sensor 120 to the pulse generator 121 to cause a decrementing pulse to be provided to the encoder-decoder 101 via conductor 122 and the OR circuit 115 to decrement the count in the encoder-decoder by one. No more pulses are then produced via conductor 122. At the time a pulse is produced on conductor 122 a signal is provided by pulse generator 121 which via conductor 125 inhibits the operation of pulse generator 113. The pulse generator 121 is arranged such that each set of four pulses (four pulses per ⅛ inch of paper) subsequently provided by the document roll sensor 120 causes a decrementing pulse to be produced on conductor 123 and applied via OR circuit 115 to the encoder-decoder 101 to decrement its count by one. Sufficient decrementing pulses are produced by the document roll sensor 120 and pulse generator 121 combination to decrement the count in the encoder-decoder to two. This count causes a signal to be presented on the output conductor 117 of encoder-decoder 101 to reset the enabling circuit 106 and terminate the driving circit 105. The encoder-decoder count is then decremented to zero to cause a signal to be produced on the output conductor 118 of encoder-decoder 101 to set the enabling circuit 106 for energizing the drive circuit 105 to initiate operation of the timing indexing mark generator circuit 107 and again provide a signal via conductor 111 and the gating signal circuit 104 to enter the output of the age length selector 100 into the encoder-decoder 101. So long as the document roll sensor 120 is operative to supply pulses to the pulse generator 121, a decrementing pulse will be produced on conductor 123 for every four pulses supplied by the document roll sensor to continue the operation of the circuitry.

When the trailing edge of the document is drawn past the document switch 48, it returns to its original position to provide a signal on the conductor 108 which is applied to pulse generator 121 serving to reset the pulse generator 121 to condition it for operation in response to termination of the operation of the pulse generator 113 when the machine is again loaded for processing a length of paper. The resetting of the pulse generator 121 also operates to remove the inhibiting signal provided to pulse generator 113 via the conductor 125.

Figure 4:
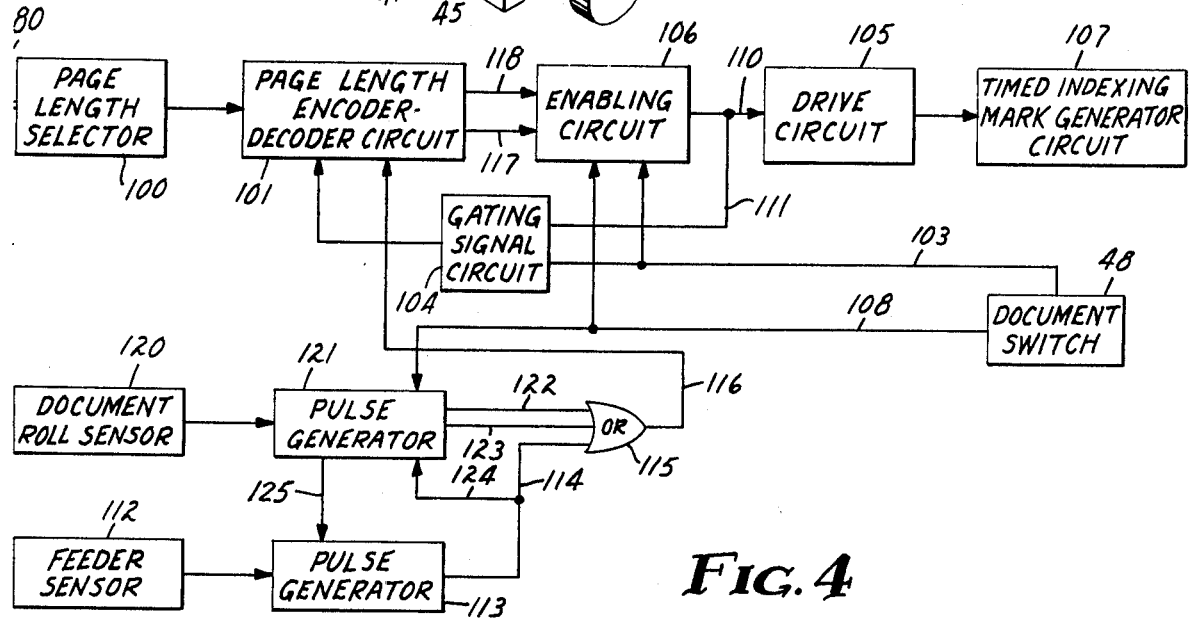
FIG. 4 is a block diagram showing the circuitry of the microfilm camera for generating the indexing marks.

Except for the timed indexing mark generator circuit 107, FIG. 5 contains the same circuitry as that of FIG. 4, but with exemplary schematic circuits shown for the following circuit portions: page length selector 100, page length encoder-decoder 101, enabling circuit 106, drive circuit 105, gating signal circuit 104 and document switch 48. With the exception of the page length selector 100, each of such circuit portions are enclosed with a dotted line which is identified by using the same reference numbers as were used in FIG. 4 for such portions.

The page length selector 100 is a switch controlled by knob 80 having a grounded movable contact 126 which can be selectively positioned to engage any one of a number of fixed contacts, each of which are separately connected via an associated resistor to a positive voltage source. In the embodiment shown, the page length selector 100 is arranged for selecting a page length of 3, 4, 6, 8½, 11 or 12 inches. The three inch selection is made by placing the movable contact 126 in contact with the fixed contact positioned at 12 o'clock in the drawing. Processing clockwise the contacts are for the increasing lengths mentioned above. The movable contact 126 is shown positioned for a 4 inch page length selection. Each of the fixed contact positions are connected to logic circuitry included in the encoder-decoder circuit 101. All the fixed contacts provide a logical 1 for the encoder-decoder circuit 101 except the fixed contact for the selection made which is grounded via the movable contact 126 to provide a logical 0 to the encoder-decoder 101.

The encoder-decoder circuit 101 includes a five bit binary down counter which is provided by the interconnected conventional D-type flip-flop circuits 131–135. The output of NOR gates 141–145 are connected to the set input, S, of flip-flop circuits 131–135, respectively. Similarly, the output of NOR gates 151–155 are connected to the reset input R of flip-flop circuits 131–135, respectively. One input of each of the NOR gates 141–145 and 151–155 is connected to receive the output provided by the gating signal circuit 104. NAND circuits 162–165 and inverters 171–175 are connected to provide the circuitry needed to provide the input to the other input provided at each of the NOR circuits 141–145 and 151–155. Such circuitry is arranged as shown to provide the logic needed in the encoder-decoder circuit so a selection made at the selector 100 will be reflected by the proper binary count at the binary down counter when entered in response to a logic 0 presented at the output of the gating signal circuit 104. As mentioned, in connection with FIG. 4, the proper count for each setting of the page length selector 100 is arranged to be two times the length in inches of the selection made. For example, in FIG. 5 the selection is set for 4 inch length which when entered into the encoder-decoder is reflected as a binary count of eight. In such case, the Q output for each of the flip-flops 131–135, except flip-flop 134, is a logical 0 with the Q output of flip-flop 134 a logical 1. The binary count is therefore 01000.

The five NOR circuits 181–185 shown to the right of the binary down counter are connected as shown serving to provide a logical 1 signal on conductor 117 when the counter is decremented to the count of two and to provide a logical 1 on conductor 118 when the counter is decremented to the count of zero. The decrementing pulses provided at the output of the OR circuit 115 are applied via the conductor 116 to the clock input. CL of the flip-flop 131 to decrement the count by one for each pule so provided.

The enabling circuit 106 includes a conventional "D" type flip-flop circuit 186 which has its D input connected via a resistor to a positive voltage source. Its set input, S, is connected to respond to the logical 1 received via conductor 118 when the count for the down counter is zero to set the flip-flop whereby a logical 1 is provided at the Q output for the enabling circuit 106. An OR circuit 187 is also included in the enabling circuit 106 and has its output connected to the reset input, R. The OR circuit 187 is connected to receive the output provided on conductor 117 from the encoder-decoder circuit 101 which will be a logical 1 when the count of two is detected serving to reset the flip-flop 186 and provide a logical 0 on conductor 110 from the output for the enabling circuit 106. Another input to the OR circuit 187 is provided via conductor 108 from the document switch 48 and is a logical 1 when the document switch is in the normally closed position, i.e., no paper is being sensed. Accordingly, with the document switch 48 in the normally closed position, the flip-flop 186 is reset so a logical 0 is presented via conductor 110 to the drive circuit 106.

A circuit suitable for use as the drive circuit 105 is shown in FIG. 5 and includes two transistors 188 and 189 which are connected whereby transistor 188 conducts when a logical 1 is presented on conductor 110 from the enabling circuit 106. Conduction of transistor 188 causes transistor 189 to conduct. The output from transistor 189 is obtained from its collector electrode which connects with the timed indexing mark generator circuit 107 (not shown in FIG. 5) to initiate its operation.

The document switch 48 is a two position snap action type of switch having two fixed contacts, normally closed contact and a normally open contact, each of which are connected to ground via separate resistors. The movable contact 190 is connected at one end to D.C. The switch is shown with movable contact in contact with the normally closed fixed contact which is the case when the switch is not detecting the presence of any document. In the normally closed position a logical 1 is provided via conductor 108 to the enabling circuit 106. The movable contact 190 moves to the normally open contact when the switch detects the presence of a document serving to place a logical 1 on conductor 103 which connects with the clock input, CL, of the flip-flop 186 of the enabling circuit 106 to set it and thereby provide a logical 1 to the drive circuit 105 via conductor 110 and to the gating signal circuit 104 via conductor 111.

The gating signal circuit 104 includes NOR circuit 191 having an inverter 192 connected to one input and a conventional one-shot multivibrator 193 connected to a second input. The output of the NOR circuit is connected to the encoder-decoder circuit 101. A logical 1 when provided by the gating circuit 104 to the encoder-decoder circuit prevents entry of the output from the paper length selector 100, while a logical 0 inputs the output from the page length selector 100 to the encoder-decoder 101 to establish a count for the down counter as represented by the length selection made at the page length selector 100. The inverter 192 receives its input from the conductor 103 connected to the normally opened fixed contact for the document switch 48, while the one-shot multivibrator 193 receives its input via conductor 111 which connects with the output of the enabling circuit 106. The one-shot multivibrator 193 is arranged to provide a logical 1 at its output when the flip-flop 186 of the enabling circuit 106 is set to provide a logical 1 to the multivibrator 193 via the conductor 111.

Figure 6:
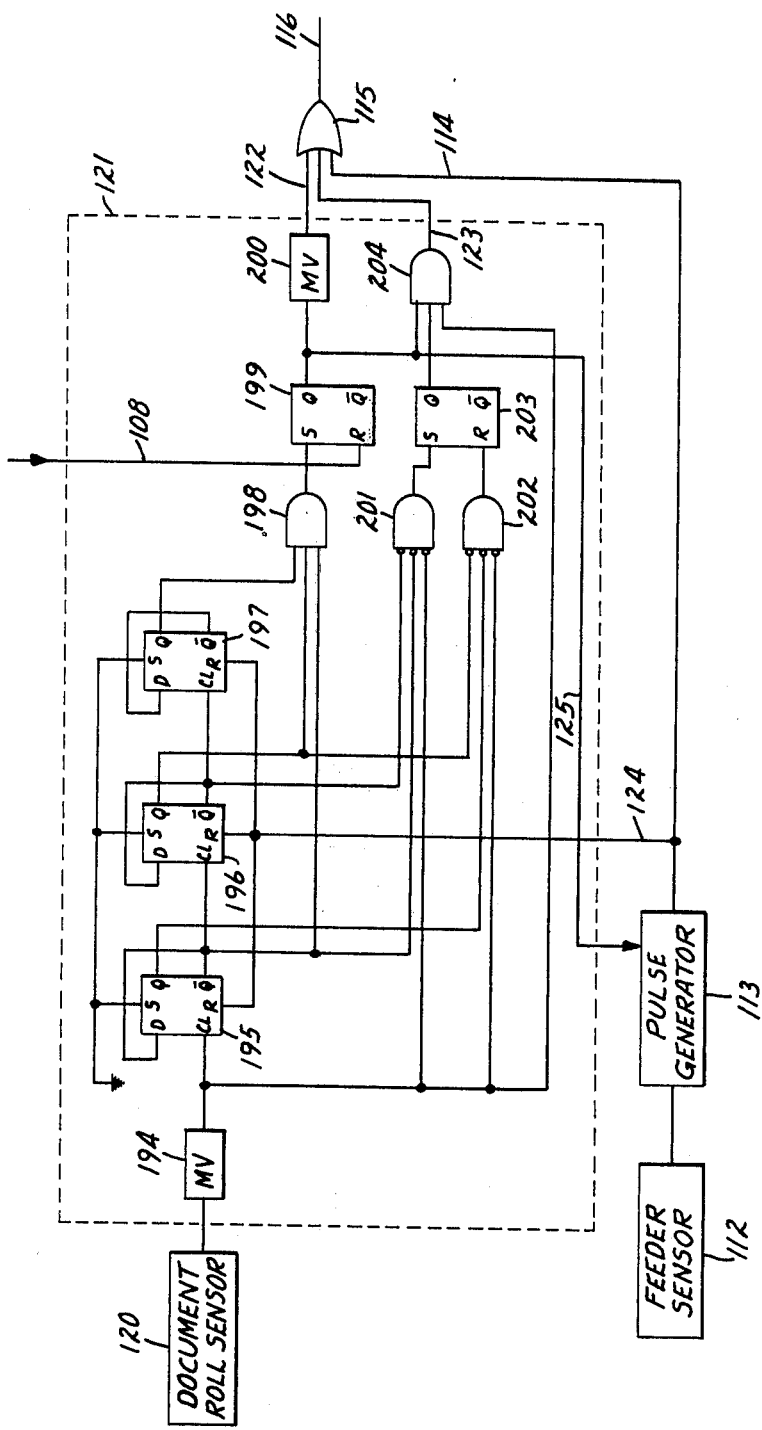
FIG. 6 is a schematic circuit diagram of a pulse generator.

FIG. 6 is provided to disclose an exemplary schematic circuit which is suitable for use as the pulse generator 121. Details are not given for the pulse generator 113 as a conventional one-shot multivibrator circuit can be used for such purpose. The portion of FIG. 6 which is enclosed with a dotted line is the schematic circuit for the pulse generator 121. It includes conventional one-shot multivibrator circuit 194 which is connected to respond to the pulses provided by the document roll sensor 120 to provide pulses to the clock input, CL, of a conventional "D"-type flip-flop 195 circuit. Flip-flop 195 and two other "D"-type flip-flops 196 and 197 are connected to provide a three bit binary up counter. An AND circuit 198 is connected to the three flip-flops 195-197 to provide a logical 1 to the set input, S, of a conventional set-reset flip-flop 199 when the up counter presents a count of six. However, so long as the pulse generator 113 is producing pulses in response to the feeder sensor 112, the six count cannot be reached as the output of the pulse counter 113 is applied via conduuctor 124 to each of the reset inputs, R, for the flip-flops 195-197 to reset the count to zero each time a pulse is produced by the pulse generator 113.

The flip-flop 199 is normally in the reset position when the processing of a document is begun, since it receives a logical 1 from the document switch 48 via the conductor 108 when the document switch is in the normally closed position, i.e., no document presented to the document switch. This reset signal is removed when the document switch 48 is operated by the presence of paper to close the normally open contacts. A conventional one-shot multivibrator 200 is connected to the Q output of flip-flop 199 and is triggered when the flip-flop 199 is set in response to detection of a count of six by the AND circuit 198. The output of the multivibrator 200 is connected to the OR circuit 115 via the conductor 122. The OR circuit 115 is connected via conductor 116 to provide decrementing pulses to the encoder-decoder circuit 101. The multivibrator 200 provides a decrementing pulse when it operates in response to the setting of flip-flop 199. The flip-flop 199 remains set until a reset signal via conductor 108 is received which occurs when the document switch 48 returns to its normally closed position, i.e., when all the document being processed has been moved past the document switch 48.

The two AND circuits 201 and 202, the reset-set flip-flop circuit 203 and the AND circuit 204 are connected as shown in FIG. 6 to provide an output pulse to the OR circuit 115 for each four pulses produced from the mutlivibrator 194 following the six pulses produced to set the flip-flop 199. It should be noted that one input to the AND circuit 204 is received from the Q output of flip-flop 199 which also is connected via conductor 125 to the pulse generator 113 to inhibit its operation when the flip-flop 199 becomes set. This serves to prevent the possibility of a pulse being provided by the pulse generator 113 after production of any decrementing pulses have been shifted to the pulse generator 121.

Having described the present invention with reference to the preferred embodiment it is to be understood that changes may be made in specific details without departing from the spirit of the invention as defined in the appended claims.

I claim:

1. A continuous document-handling attachment for a document microfilm camera having a document feed roll, means for projecting images of the document as it moves past a photographic station on the document feed roll to a focal plane, means for advancing a film synchronously with the movement of the document feed roll, and an indexing mark exposure device for exposing a frame mark on the film as each document is filmed, said attachment comprising a support for supporting a document to be photographed, at least one wheel supported by a rotatable shaft to be driven from a said document to rotate said shaft, document sensor means to produce electrical pulses as said wheel is rotated to indicate incremental movement of the document, first counter means responsive to a predetermined number of pulses from said document sensor means for energizing said exposure device, feed roll sensor means for generating pulses upon rotation of said feed roll through given increments, and second counter means for counting said generated pulses from said feed roll sensor means, said second counter means being connected to said document sensor means and being reset to 0 when a pulse is generated from said document sensor means and said second counter means pulsing said first counter means when pulses are not produced by said document sensor means.

2. An attachment according to claim 1 wherein said first counter means responsive to a predetermined number of pulses is a counter adjustable to respond to different numbers of pulses for operating said exposure device.

3. An attachment according to claim 1 wherein said first counter means includes a binary down-counter which is decremented each time a pulse is received from said document sensor means.

4. An attachment according to claim 3 wherein said second counter means produces a pulse to decrement said binary down-counter if said second counter means reaches a predetermined count and a succession of subsequent pulses produced upon said second counter means reaching successive lesser counts.

5. A continuous document-handling attachement for a document microfilm camera having a document feed roll, means for projecting images of the document as it moves past a photographing statin on the document feed roll to a focal plane, means for advancing a film synchronously with the movement of the document feed roll, and an indexing mark exposure device including a timed indexing mark generator circuit for exposing an indexing mark on the film as each document is filmed, said attachment comprising:

switch means having a position which it assumes it response to the presence of a document at said switch means;

a document length selector;

a document length encoder-decoder operatively connected to said document length selector, said encoder-decoder providing a first signal in response to said encoder-decoder circuit receiving a predetermined number of pulses when said encoder-decoder is set in accordance with the setting of said selector;

circuit means operatively connected to said switch means, said time indexing mark generator circuit, and to said document length encoder-decoder for providing a second signal to said timed indexing mark generator circuit for initiating its operation, said circuit means providing said second signal in response to movement of said switch means to said position and providing said second signal in response to said first signal when provided by said encoder-decoder circuit;

gating signal circuit means connected to said circuit means and said encoder-decoder for providing a single gating signal to said encoder-decoder in response to said second signal provided by said circuit means for resetting said encoder-decoder in accordance with the setting of said selector; and pulse generating means operatively connected to said encoder-decoder and operative in response to movement of a said document for providing pulses to said encoder-decoder.

6. An attachment according to claim 5 wherein said encoder-decoder circuit includes a binary down-counter which is set in accordance with said selector when said single gating signal is provided from said gating signal circuit to said encoder-decoder, said counter when decremented in response to said predetermined number of pulses causing said encoder-decoder to provide said first signal.

7. An attachment according to claim 6 wherein said binary down-counter is connected to receive said pulses provided by said pulse generating means and is decremented one count by each such pulse received.

8. An attachment according to claim 7 wherein said switch means has a second position which it assumes in the absence of a said document, said switch means operatively connected to said pulse generating means for inhibiting its operation when said switch means is in said second position.

9. An attachment according to claim 5 wherein said document length encoder-decoder provides a third signal in response to said encoder-decoder receiving a number of pulses which is less than said predetermined number, said circuit means receiving said third signal when provided by said encoder-decoder and in response thereto terminating said second signal provided by said circuit means to said timed indexing mark generator circuit.

10. An attachment according to claim 5 wherein said pulse generating means includes at least one pin wheel supported by a rotatable shaft to be driven from a said document to rotate said shaft and means producing an electrical pulse for each incremental movement of said wheel.

11. An attachment according to claim 5 wherein said pulse generating means includes a first pulse generator and a second pulse generator for providing said pulses to said encoder-decoder from said pulse generating means, said second pulse generator operatively connected to said first pulse generator for inhibiting the operation of said second pulse generator while said first pulse generator is producing said pulses to said encoder-decoder from said pulse generating means.

12. An attachment according to claim 11 wherein said switch means has a second position which it assumes in the absence of a said document, said switch means operatively connected to said pulse generating means for inhibiting its operation when said switch means is in said second position.

13. An attachment according to claim 5 wherein said switch means has a second position which it assumes in the absence of a said document, said switch means operatively connected to said pulse generating means for inhibiting its operation when said switch means is in said second position.

* * * * *